(12) United States Patent
Cocaud et al.

(10) Patent No.: US 12,670,597 B2
(45) Date of Patent: Jun. 30, 2026

(54) SYSTEMS AND METHODS FOR EFFICIENTLY SENSING COLLISION THREATS

(71) Applicant: A^3 by Airbus, LLC, Sunnyvale, CA (US)

(72) Inventors: Cedric Cocaud, Sunnyvale, CA (US);
Arne Stoschek, Palo Alto, CA (US);
Harvest Zhang, Sunnyvale, CA (US);
Alexander Dean Naiman, Santa Clara, CA (US)

(73) Assignee: A^3 BY AIRBUS, LLC, Sunnyvale, CA (US)

( * ) Notice: Subject to any disclaimer, the term of this patent is extended or adjusted under 35 U.S.C. 154(b) by 443 days.

(21) Appl. No.: 17/788,682

(22) PCT Filed: Dec. 23, 2019

(86) PCT No.: PCT/US2019/068398
§ 371 (c)(1),
(2) Date: Jun. 23, 2022

(87) PCT Pub. No.: WO2021/133384
PCT Pub. Date: Jul. 1, 2021

(65) Prior Publication Data
US 2023/0022429 A1     Jan. 26, 2023

(51) Int. Cl.
*G06T 7/11* (2017.01)
*G01S 13/935* (2020.01)
(Continued)

(52) U.S. Cl.
CPC .............. *G06T 7/11* (2017.01); *G01S 13/935* (2020.01); *G06T 7/136* (2017.01); *G06V 10/25* (2022.01);
(Continued)

(58) Field of Classification Search
CPC . G06T 7/11; G06T 7/136; G06T 2207/10024; G06T 2207/10028;
(Continued)

(56) References Cited

U.S. PATENT DOCUMENTS

| 9,224,054 B2 | 12/2015 | Ghose et al. |
| 9,564,034 B2 | 2/2017 | Foster et al. |

(Continued)

FOREIGN PATENT DOCUMENTS

| WO | 2012014972 A1 | 2/2012 | |
| WO | WO-2018182737 A1 * | 10/2018 | ......... B60R 21/0134 |

OTHER PUBLICATIONS

Wang Bihao, "Geometrical and contextual scene analysis for object detection and tracking in intelligent vehicles", (Jul. 8, 2015), 160 pp., Computer Vision and Pattern Recognition [cs.CV]. Université de Technologie de Compiègne, 2015. https://tel.archives-ouvertes.fr/tel-01296566/file/These_UTC_Bihao_Wang.pdf.

(Continued)

*Primary Examiner* — Henok Shiferaw
*Assistant Examiner* — Woo C Rhim
(74) *Attorney, Agent, or Firm* — NIXON PEABODY LLP

(57)     ABSTRACT

A system for efficiently sensing collision threats has an image sensor configured to capture an image of a scene external to a vehicle. The system is configured to then identify an area of the image that is associated with homogeneous sensor values and is thus likely devoid of collision threats. In order to reduce the computational processing required for detecting collision threats, the system culls the identified area from the image, thereby conserving the processing resources of the system.

19 Claims, 9 Drawing Sheets

(51) Int. Cl.
| | |
|---|---|
| *G06T 7/136* | (2017.01) |
| *G06V 10/25* | (2022.01) |
| *G06V 10/50* | (2022.01) |
| *G06V 20/13* | (2022.01) |

(52) U.S. Cl.
CPC ............ *G06V 10/507* (2022.01); *G06V 20/13* (2022.01); *G06T 2207/10024* (2013.01); *G06T 2207/10028* (2013.01); *G06T 2207/10032* (2013.01); *G06T 2207/20081* (2013.01); *G06T 2207/20084* (2013.01); *G06T 2207/30261* (2013.01)

(58) Field of Classification Search
CPC . G06T 2207/10032; G06T 2207/20081; G06T 2207/20084; G06T 2207/30261; G01S 13/935; G06V 10/25; G06V 10/507; G06V 20/13; G06V 20/58
See application file for complete search history.

(56) References Cited

U.S. PATENT DOCUMENTS

| | | | | |
|---|---|---|---|---|
| 10,317,520 | B2 * | 6/2019 | Capraro | G01S 13/90 |
| 2006/0147113 | A1 * | 7/2006 | Han | G06T 7/11 |
| | | | | 382/171 |
| 2006/0274958 | A1 | 12/2006 | Piastowksi | |
| 2006/0274959 | A1 * | 12/2006 | Piastowski | H04N 19/86 |
| | | | | 382/268 |
| 2007/0255480 | A1 * | 11/2007 | Southall | B60T 7/22 |
| | | | | 701/96 |
| 2010/0104199 | A1 * | 4/2010 | Zhang | G08G 1/166 |
| | | | | 382/199 |
| 2013/0321627 | A1 * | 12/2013 | Turn, Jr. | H04N 23/21 |
| | | | | 348/148 |
| 2014/0104051 | A1 * | 4/2014 | Breed | G08G 1/09626 |
| | | | | 340/435 |
| 2014/0219507 | A1 * | 8/2014 | Ghose | G06T 7/12 |
| | | | | 382/104 |
| 2015/0175072 | A1 * | 6/2015 | Sabeti | G06V 20/58 |
| | | | | 348/148 |
| 2017/0213149 | A1 | 7/2017 | Micks et al. | |
| 2018/0165527 | A1 * | 6/2018 | Park | G06V 20/58 |
| 2018/0233048 | A1 * | 8/2018 | Andersson | B60Q 9/008 |
| 2018/0259960 | A1 * | 9/2018 | Cuban | G05D 1/104 |
| 2019/0042865 | A1 * | 2/2019 | Vallespi-Gonzalez | |
| | | | | G06T 7/521 |
| 2019/0051191 | A1 * | 2/2019 | Mosher | G06F 18/251 |
| 2019/0087635 | A1 * | 3/2019 | Klaus | H04N 13/239 |
| 2019/0103026 | A1 * | 4/2019 | Liu | G06V 10/25 |
| 2019/0339706 | A1 * | 11/2019 | Batur | G05D 1/0223 |
| 2019/0354782 | A1 * | 11/2019 | Kee | G06F 18/2321 |
| 2020/0065981 | A1 * | 2/2020 | Akashi | G06T 7/194 |
| 2020/0126237 | A1 * | 4/2020 | Pfeiffer | G06V 20/56 |
| 2020/0211394 | A1 * | 7/2020 | King | B60W 50/023 |
| 2020/0272164 | A1 * | 8/2020 | Gray | G06F 18/2178 |
| 2020/0278703 | A1 * | 9/2020 | Shim | G08G 5/0069 |
| 2020/0286383 | A1 * | 9/2020 | Tran | G06N 3/045 |
| 2020/0307661 | A1 * | 10/2020 | Hania | G06T 7/13 |

OTHER PUBLICATIONS

Schmidt Frank et al., "Sky Detection in CSC-Segmented Color Images", Proceedings of the Fourth International Conference on Computer Vision Theory and Applications, (2009), pp. 101-106, https://www.scitepress.org/papers/2009/15606/15606.pdf.

Yazdanpanah Ali Pour et al., "Sky Segmentation by Fusing Clustering with Neural Networks", (2013), Lecture Notes in Computer Science, vol. 8034, pp. 663-672 (12 pp.), Springer-Verlag, Berlin, Heidelberg.

Kaneko M. Kaneko et al., "Mask-SLAM: Robust Feature-Based Monocular SLAM by Masking Using Semantic Segmentation," 2018 IEEE/CVF Conference on Computer Vision and Pattern Recognition Workshops (CVPRW), pp. 371-379, Salt Lake City, UT, USA.

Yenikaya Sibel et al., "Keeping the vehicle on the road—A Survey on On-Road Lane Detection Systems", ACM Computing Surveys., vol. 46, No. 1, (Oct. 2013), pp. 1-43, New York, USA.

NETO Miranda A. et al., "Robust Horizon Finding Algorithm for Real-Time Autonomous Navigation based on Monocular Vision", Proceedings of the 14th International IEEE Conference on Intelligent Transportation Systems, (Oct. 5, 2011), pp. 532-537, Washington, DC, USA.

Extended European Search Report and Search Opinion for EP Application No. 19957311.4 mailed Jul. 18, 2023, 10 pp.

Communication Pursuant to Article 94(3) in European Application No. 19957311.4 dated Oct. 2, 2025, 10 pp.

\* cited by examiner

FIG. 9

SYSTEMS AND METHODS FOR EFFICIENTLY SENSING COLLISION THREATS

RELATED ART

Aircraft may encounter a wide variety of collision threats during flight, such as debris, other aircraft, equipment, buildings, birds, terrain, and other objects. Collision with any such object may cause significant damage and/or injury to an aircraft and its occupants. Sensors may be used to detect objects that pose a collision risk and warn a pilot of detected collision risks. In a self-piloted aircraft, sensor data indicative of objects around the aircraft may be used autonomously to avoid collision with the detected objects.

To ensure safe and efficient operation of an aircraft, it is desirable to detect objects in all of the space around the aircraft. However, detecting objects around an aircraft and determining a suitable path for the aircraft to follow in order to avoid colliding with the objects can be challenging. Systems capable of performing the assessments needed to reliably detect and avoid objects external to the aircraft may be burdensome and computationally expensive to implement.

To illustrate, a self-piloted aircraft may have, on its exterior, a large number of image sensors, such as cameras, that provide sensor readings for full, 3-dimensional coverage of the spherical area surrounding the aircraft. The data collected from these image sensors may be processed by one or more processors (e.g., CPUs) implementing various algorithms to determine whether an image captured by a camera depicts a collision threat. Further, to facilitate detection of collision threats, high resolution cameras may be used, and the amount of data from a large number of high-resolution cameras can be significant and consume an extensive amount of processing resources. Systems and methods for reducing the processing burdens associated with the detection of collision threats without compromising safety or system robustness are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 9 depicts an exemplary scene external to a vehicle.

DETAILED DESCRIPTION

Figure 1:
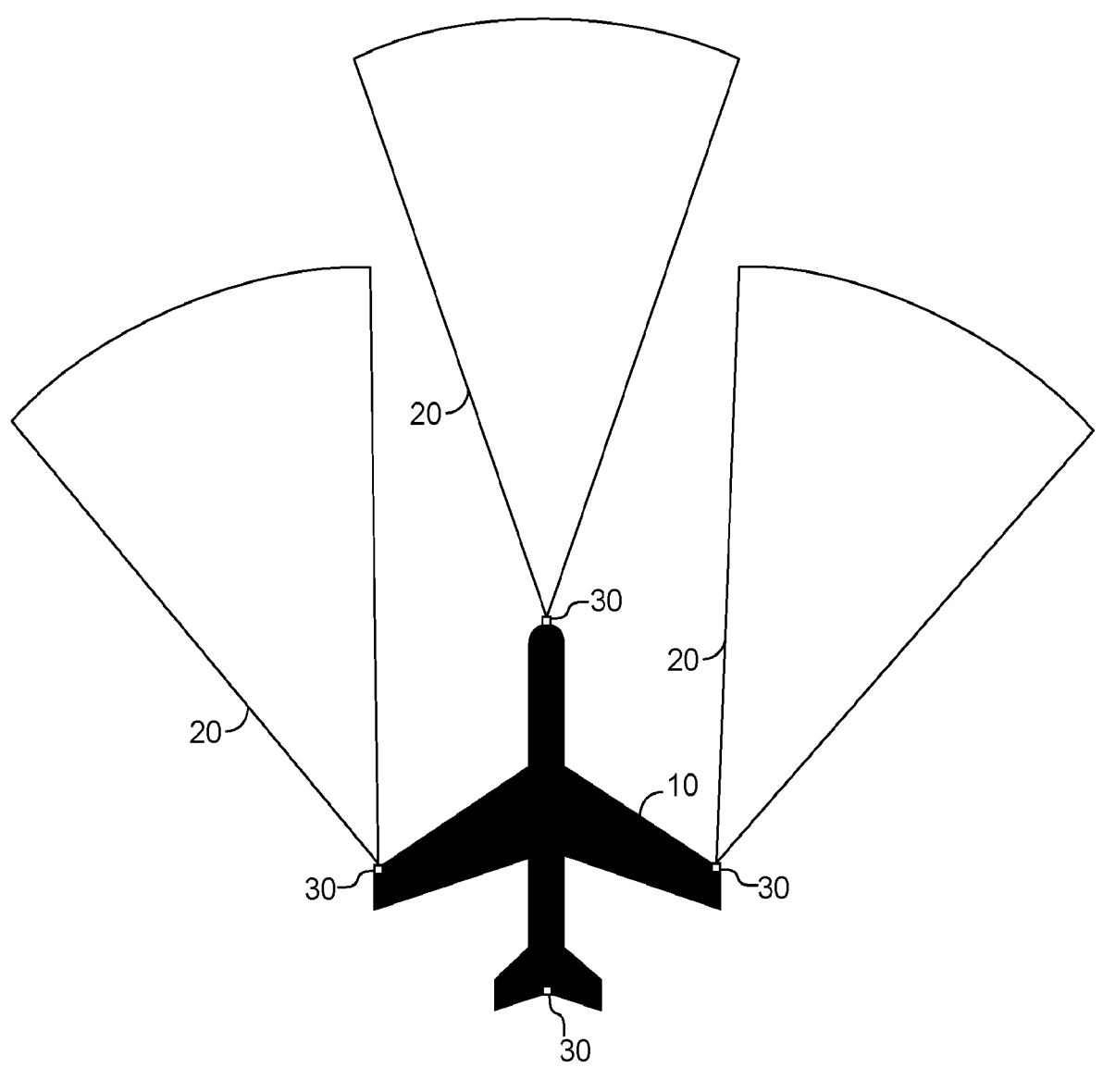
FIG. 1 depicts a vehicle with multiple sensors.

The present disclosure generally pertains to systems and methods for efficiently sensing collision threats. A system in accordance with one embodiment of the present disclosure is configured to capture an image of a scene external to a vehicle and to then identify and cull areas of low interest (e.g., areas associated with homogeneous sensor values) from the image to reduce the computational processing needed for detecting collision threats. In this regard, such areas likely have no collision threats, and the system therefore does not need to usurp processing resources analyzing the areas. Thus, the total amount of image data needed to be analyzed for identifying collision threats is reduced without compromising safety. Considering that a vehicle, such as an autonomous aircraft, might utilize a large number of high-resolution image sensors, a significant amount of processing resources may be conserved by culling areas associated with homogeneous sensor values, referred to hereafter as "homogeneous areas."

In some embodiments, a vehicle has an image sensor (e.g., one or more cameras) that captures at least one image of an area or scene external to the vehicle. The image sensor is configured to feed images to a filter that identifies homogeneous areas within the images. An area of an image (which corresponds to a geographic region of the imaged scene) may be determined to be homogeneous by comparing sensor values (e.g., pixels) associated with the area. In this regard, the area may be considered to be "homogenous" if such values are substantially similar indicating that there is not likely a collision threat within the geographic region represented by such area. A filter is used to cull areas of the image determined to be homogenous such that the homogenous areas are not processed by an object detector that is configured to analyze the image for the purpose of identifying collision threats.

In some embodiments, conventional segmentation techniques may be used to facilitate detection of homogeneous areas. As an example, a frame of image data may be first segmented and resulting image segments may then be checked for homogeneousness. Such determinations may be made by comparing pixel values in an image segment to determine whether they are sufficiently similar such that an image of a collision threat is not likely within the segment. In some embodiments, homogeneousness determinations may be made by analyzing histograms of the segment. In other embodiments, a homogeneous areas may be identified with the use of another sensor, such as another image sensor, a radar sensor, or a light detection and ranging (LiDAR) sensor. In this regard, sensor data from such other sensor may be analyzed to identify a region within the scene associated with homogenous sensor values. The area of a captured image corresponding to this same region may be identified as a homogeneous area of the image and, therefore, culled as described above. Thus, an area of an image may be identified as "homogeneous" by analyzing the pixel values of the image or sensor data from other sensors corresponding to the same geographic region.

In some embodiments, the vehicle has a user, such as a pilot or driver who manually controls operation of the vehicle. In such case, the object detector may identify collision threats and provide information indicative of such collisions threats to the user who may then use the information to control the vehicle, such as steering the vehicle to avoid the identified collision threats. In other embodiments, the vehicle may be self-piloted or, in other words, autonomous. In such case, the object detector may provide information indicative of identified collision threats to a control system for autonomously controlling operation of the vehicle, and the control system can use such information to control the vehicle, such as steering the vehicle to avoid the identified collision threats. Other uses of the identified collision threats are possible in other embodiments.

FIG. 1 depicts an exemplary embodiment of a vehicle having a system for detecting collision threats. FIG. 1 depicts a view of a vehicle 10 having a plurality of image sensors 30, each image sensor 30 having its own field of view 20. While FIG. 1 depicts an airplane, the principles of the disclosure may be applied to any vehicle (e.g., boat, car, truck, and other types of aircraft, such as drone or a helicopter). While FIG. 1 depicts four sensors 30, any number of sensors 30 are possible in other embodiments. The sensors 30 may be directed in specific fixed directions with respect to the vehicle 10 or may be mounted in such a way to allow for panning or rotating of the sensors' fields of view 20 to different angles and directions with respect to the vehicle 10. Each sensor 30 is configured to capture one or more images of the external surroundings for use in detecting collision threats, as will be described in more detail below. As an example, each image sensor 30 may be a video camera that provides a video stream comprising frames of image data, where each frame defines a captured image for the sensor's field of view. As known in the art, each image frame may be a collection of pixels, each pixel having a respective intensity value indicative of a color and brightness of light reflected from a respective geographic point within the sensor's field of view.

Figure 2:
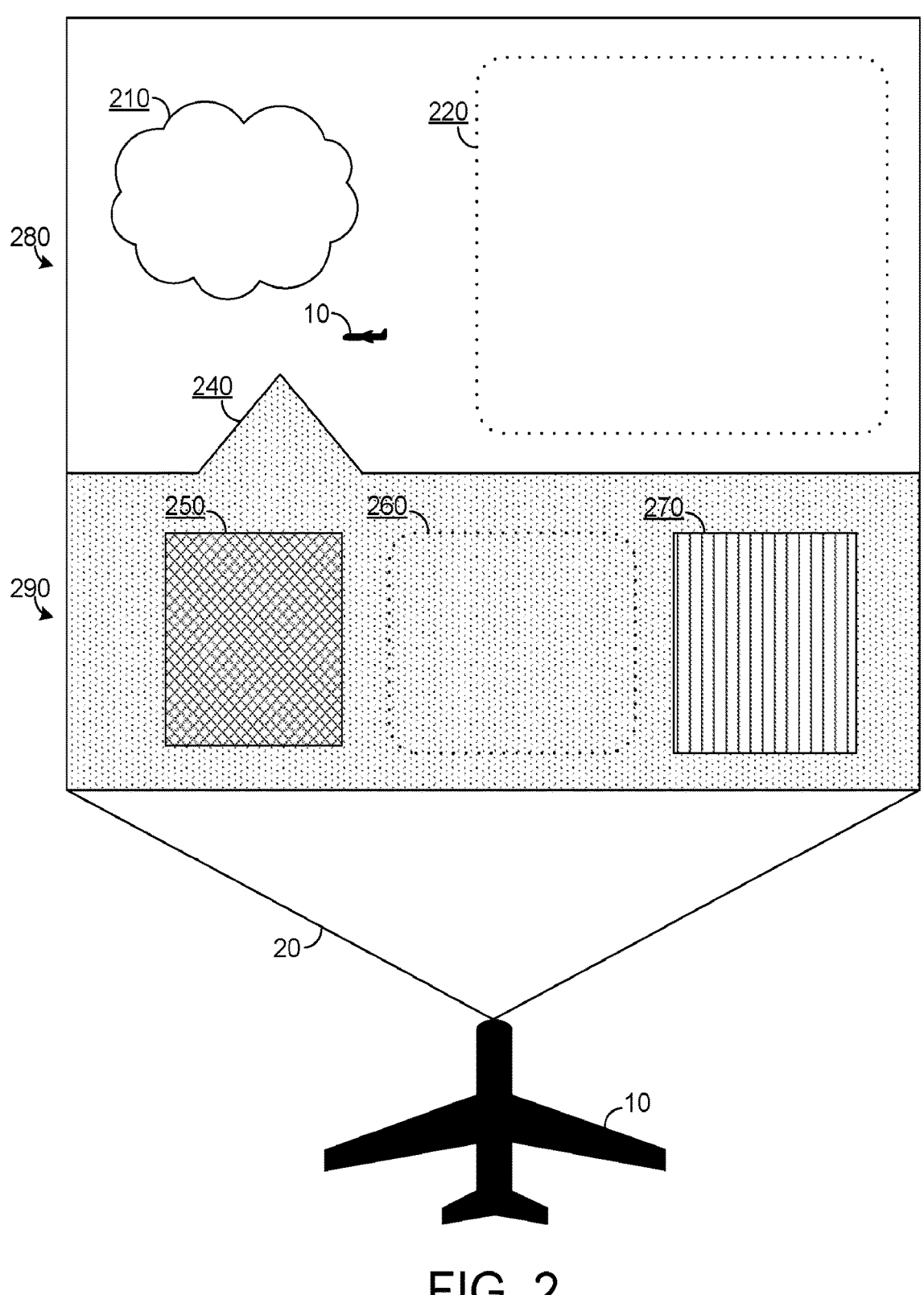
FIG. 2 depicts an image of a scene external to the vehicle depicted by FIG. 1.

FIG. 2 depicts a captured image 200 of a scene that is external to the vehicle 10 within the field of view 20 of image sensor 30 (not shown in FIG. 2) that captured the image 200. An image 200 may depict the sky 280, the ground 290, or some combination thereof. The sky 280 may include one or more vast, open spaces 220, clouds 210, birds (not shown), other vehicles 10, or other objects. The ground 290 may include mountains 240, fields 250, 260, 270 (e.g., grass, dirt, crops, etc.), buildings (not shown), lakes (not shown), rivers (not shown), or other surface features.

Sensed values, such as pixel values within a captured image, for reflections from many types of objects, such as collision threats, are often inhomogeneous. In this regard, a typical collision threat, such as another vehicle, often exhibits different contours and colors across a visible surface of the collision threat. Thus, the sensed value for a reflection from one portion of the collision threat will often vary drastically from the sensed value from another portion of the collision threat. Therefore, if a relatively large area of a captured image can be associated with sensed values that are substantially homogenous, then it can be safely assumed that such area is devoid of collision threats. For example, if no collision threat is within the sky space 220, then the sensed values for reflections from this space 220 may be homogenous. However, if the sensed values are inhomogeneous, then it is possible that the sensed values may be indicative of a collision threat.

As an example, if the sky space 220 is devoid of collision threats, then the portion of the image 200 corresponding to the sky space 220 may have values that are substantially homogenous (e.g., the intensity values for the pixels representing the sky space 220 may be about the same, such as a particular shade of blue). Similarly, if no collision threat is between the vehicle 10 and the field 260, then the sensed values for reflections this field 260 may be homogenous. As an example, the portion of the image 200 corresponding to the field 260 may have values that are substantially homogenous (e.g., the intensity values for the pixels representing the field 260 may be about the same, such as a particular shade of green). These homogeneous areas of the image 200 can be identified and culled so that they are not processed for detecting collision threats. Significant computing resources and power can be saved by not processing these areas of a scene's image, particularly when such savings are realized for a large number of images.

Figure 3:
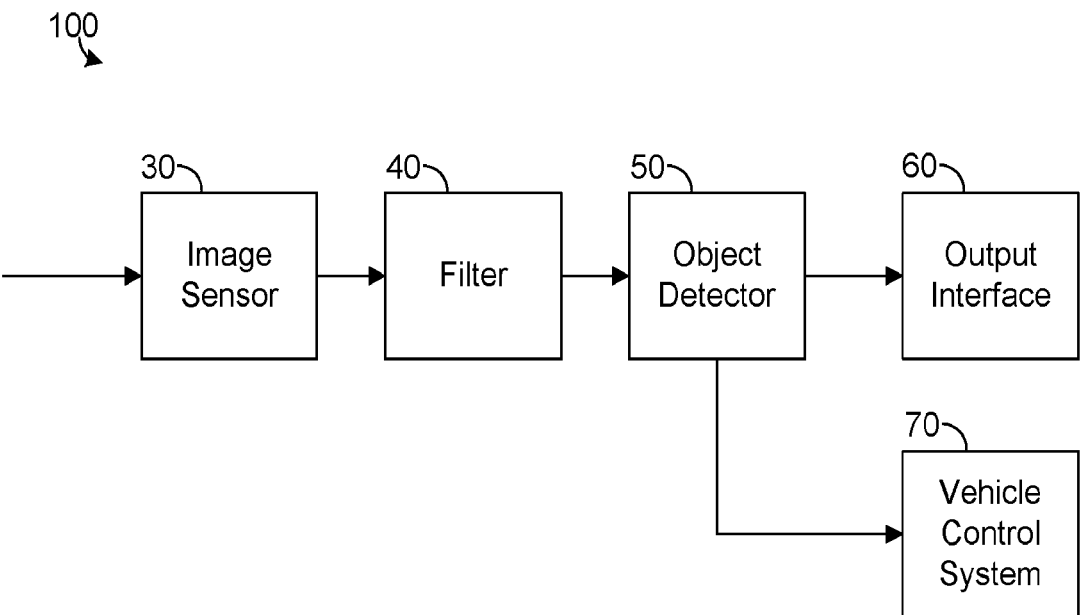
FIG. 3 is a block diagram illustrating an exemplary embodiment of a system for sensing collision threats.

FIG. 3 is a block diagram illustrating an exemplary embodiment of a system 100 for detecting collision threats. The system 100 may reside on the vehicle 10 and has at least one image sensor 30 that captures at least one image of scene and provides image data defining the captured image to a filter 40. The filter 40 is configured to cull at least some of the image data to reduce the overall size of the image data defining the captured image and provide the filtered data to an object detector 50, which may analyze the filtered data to detect collision threats. The object detector 50 may include one or more processors that implement machine learning algorithms (e.g., deep learning pipelines) or other technologies for detecting, identifying, and classifying objects that may be collision threats to the vehicle 10. Such detection may include determining if a detected object is on a collision course with the intended path of the vehicle 10 or is likely to come sufficiently close to the vehicle 10 to be threat to the safe operation of the vehicle 10. Information regarding the detected objects can then be passed to an output interface 60 or a vehicle control system 70.

The vehicle control system 70 may be configured to control operation of the vehicle 10 based on the information from the filter 40. As an example, in an autonomous vehicle (e.g., self-piloted or self-driven), the vehicle 10 may include one or more processors that provide control inputs for controlling the vehicle 10 to steer it in a direction to avoid a collision with the collision threat detected by the object detector 50. Exemplary configurations and operations of the object detector 50 and vehicle control system are described in U.S. patent application Ser. No. 16/611,427, entitled "Systems and Methods for Sensing and Avoiding External objects for Aircraft" and filed on Nov. 6, 2019, which is incorporated herein by reference.

In operator-controlled vehicles, the output interface 60 may be configured to display or otherwise output information from the filter 40 about detected collision threats. As an example, the output information may display or otherwise output warnings indicative of detected collision threats so that a user, such as a pilot or driver of the vehicle 10, may use such information to control the vehicle 10. Such information may also be displayed to a user in an autonomous vehicle, such as a user who may optionally assume control of the vehicle 10 to avoid collision threats or perform other maneuvers.

Figure 4:
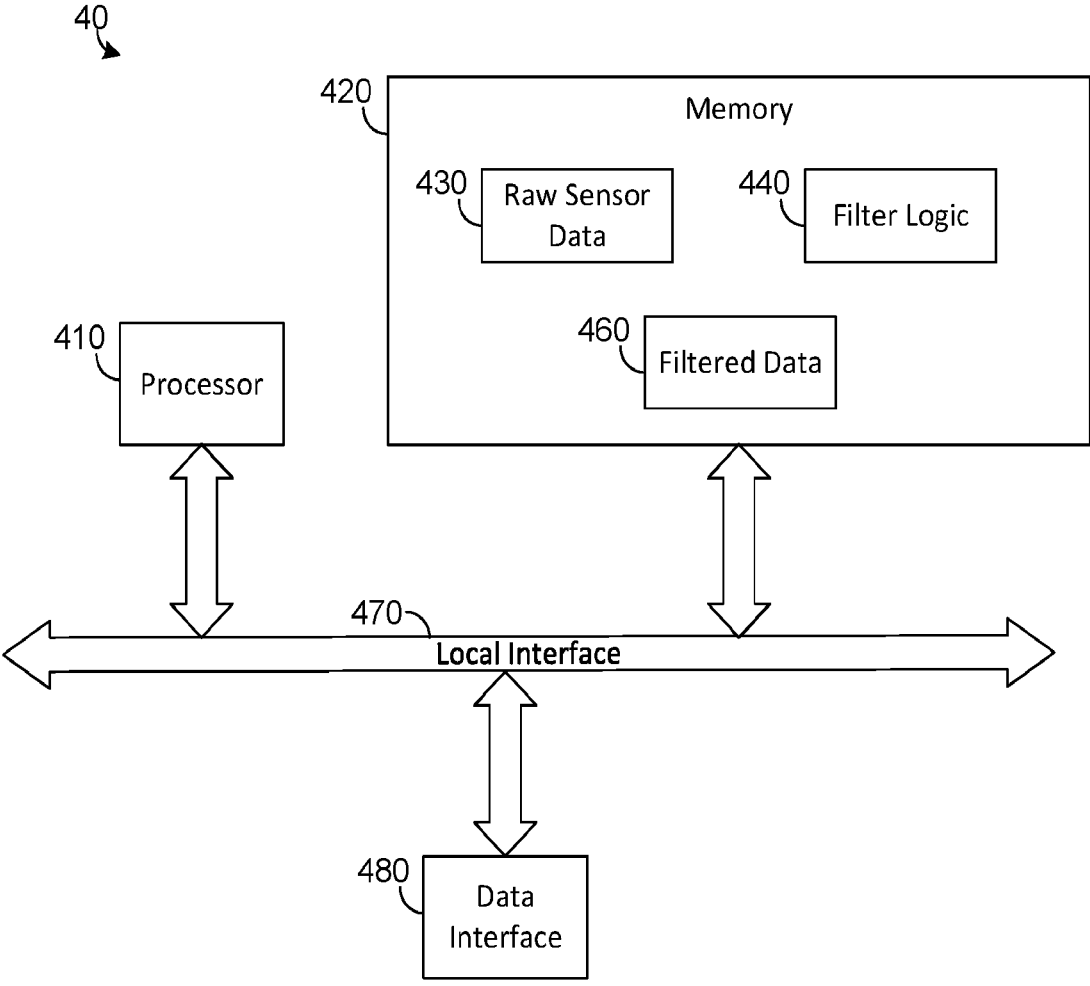
FIG. 4 is a block diagram illustrating an exemplary embodiment of a filter, such as is depicted by FIG. 3.

The filter 40 may be implemented in specialized hardware (e.g., a FGPA or ASIC, or other appropriate type of analog or digital circuits), hardware (e.g., one or more processors) executing software, or some combination thereof. FIG. 4 is a diagram illustrating an exemplary embodiment of a filter 40. The filter 40 depicted by FIG. 4 has at least one processor 410, memory 420, and data interface 480. These components may communicate with one another through a local interface 470 (e.g., a system bus). Memory 420 may contain raw sensor data 430 (e.g., images) or some portion of the sensor data stream received from one or more sensors 30, filter logic 440, and filtered data 460.

The processor 410 may include hardware for executing instructions, (e.g., instructions from the filter logic 440) such as a central processing unit (CPU), a digital signal processor (DSP), a graphics processing unit (GPU), an FPGA, or other types of processing hardware, or any combination thereof. The processor 410 may be configured to execute instructions stored in memory 420 in order to perform various functions, such as processing of raw sensor data 430 from the image sensors 30.

The filter logic 440 is configured to cull portions of the raw sensor data 430, such as areas that the logic 440 determines are likely free of collision threats. Such culling may include removing such portions altogether from the raw sensor data 430 or in some embodiments instead of removing the data indications may be stored indicating portions of the raw sensor data 430 that may be ignored by the object detector 50. Exemplary techniques for culling the raw sensor data 430 will be described in more detail below. Regardless of the type of culling performed, the culling effectively prevents the object detector 50 from analyzing the culled data for the purpose detecting collision threats, thereby reducing the processing burdens of the object detector 50.

Figure 5:
FIG. 5 is a block diagram illustrating an exemplary embodiment of an object detector, such as is depicted by FIG. 3.
Figure 5:
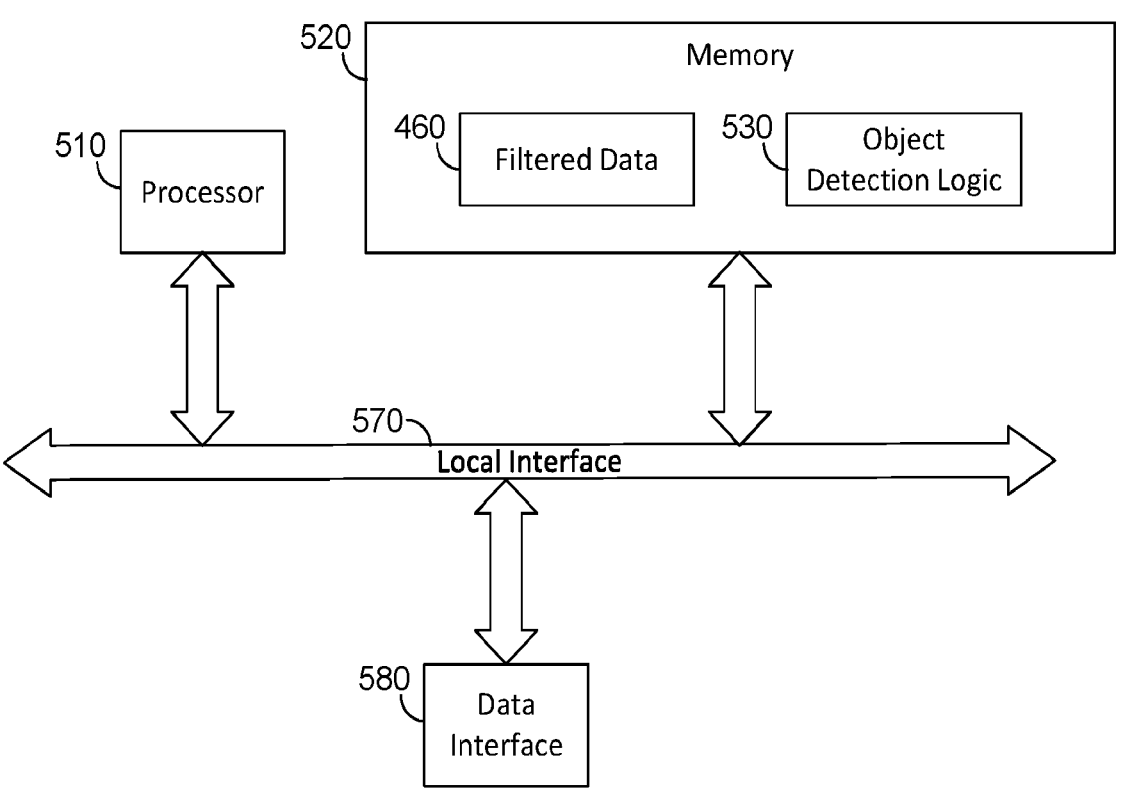

The object detector 50 may be implemented in specialized hardware (e.g., a FGPA or ASIC, or other appropriate type of analog or digital circuits), hardware (e.g., one or more processors) executing software, or some combination thereof. FIG. 5 is a diagram illustrating an exemplary embodiment of an object detector 50. The object detector 50 depicted by FIG. 5 has at least one processor 510, memory 520, and data interface 580. These components may communicate with one another through a local interface 570 (e.g., a system bus). Memory 520 may contain filtered data 460 received from the filter 40 and object detection logic 530.

The object detection logic 530 is configured to process the filtered data 460 looking for external objects relevant to the control of the vehicle 10. Such objects may include collision threats (e.g., birds, other aircraft, debris, towers, buildings, etc.). Information regarding detected objects may be sent to the vehicle control system 70 and/or the output interface 60. The object detection logic 530 may be implemented in many ways including machine-learning algorithms that analyze the filtered data for detecting and classifying objects that may be collision threats. In some embodiments, the filter 40 and the object detector 50 may share resources. Such resources may include one or more processors and/or memory. For example, the same processors or group of processors used to identify an area of an image associated with homogeneous sensor values and cull such area to provide a filtered image may also be used to analyze the filtered image to detect collision threats.

Figure 6:
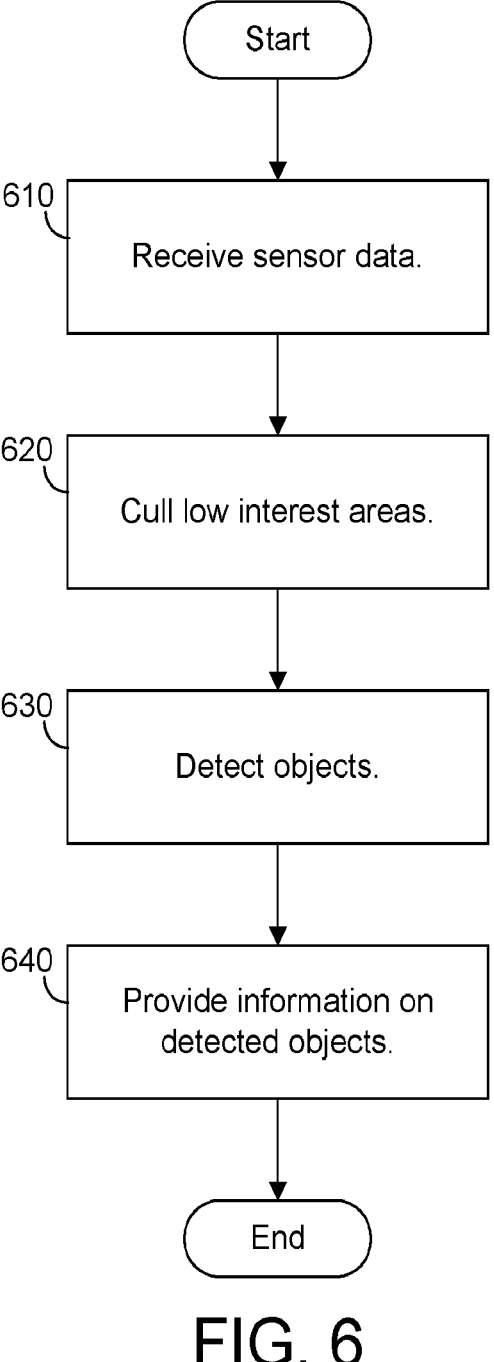
FIG. 6 is a diagram illustrating an exemplary process for detecting collision threats.

FIG. 6 is a diagram illustrating an exemplary process for detecting collision threats. At Step 610, the filter 40 receives raw sensor data 430 from one or more image sensors 30. At Step 620, the filter 40 culls areas of an image associated with homogeneous sensor values. In some embodiments raw sensor data 430 defining an image captured by an image sensor 30 may be segmented in order to facilitate identification of areas to be culled. Segmentation may be done in a variety of ways including but not limited to using edge detection or subdividing the image into fixed size blocks (e.g., 10 by 10, 20 by 20, 30 by 40, etc.). In some embodiments, segmentation may be performed such that pixels having a similar color, intensity or contrast pattern or distribution are grouped to form a segment to be analyzed. Various known segmentation algorithms may be used to divide an image into one or more segments.

Each segment can then be analyzed by the filtering logic 440 to determine whether the segment is homogeneous. As an example, for each segment, the filtering logic 440 may compare the pixels of the segment. If a sufficiently high number of pixels have intensity values within a certain range of each other, then the filtering logic 440 may be configured to identify the segment as a homogenous area of the image to be culled in step 620. Note that a variety of techniques may be used to determine whether a segment of an image is homogeneous.

Figure 7:
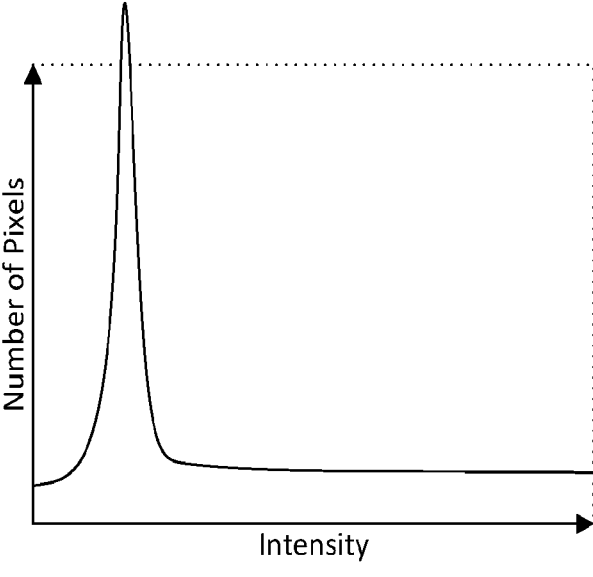
FIG. 7 depicts an exemplary histogram of a homogeneous sensor values.
Figure 8:
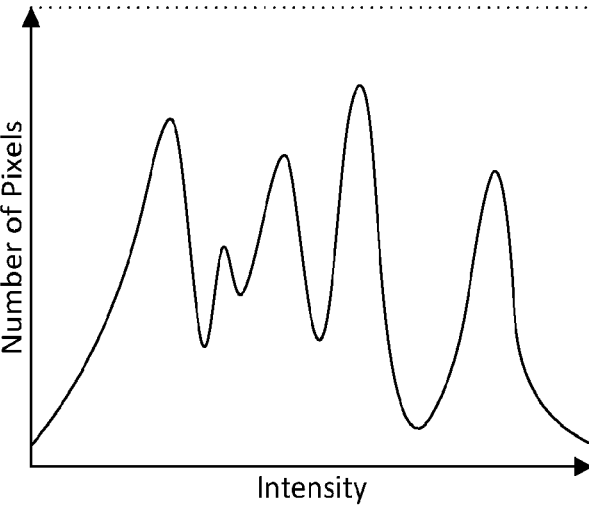
FIG. 8 depicts an exemplary histogram of inhomogeneous sensor values.

FIG. 7 depicts an exemplary histogram of a homogeneous segment. As is shown most if not all the pixels are within a tight range of intensity as evidenced by a high impulse peak in the curve. FIG. 8 depicts an exemplary histogram of an inhomogeneous segment. As shown by FIG. 8, the curve is characterized by a relatively large number of small peaks spread across the intensity axis. None of the peaks in FIG. 8 are nearly as high as the single peak depicted by FIG. 7. There are various techniques that can be used to determine whether the intensity values of a segment have a signature indicative of homogeneity.

For example, the filter logic 440 may be configured to calculate or otherwise determine the average intensity value of a segment then check to determine how many or what percentage of the pixels have intensity values within a predefined threshold of the average value. In such an example, such number or percentage of the pixels is indicative of the homogeneity of the sensor values, and this value may be compared to a threshold to determine whether the segment should be considered to be homogeneous. In this regard, if the value exceeds the threshold, then the filter logic 440 may determine that the segment is indeed homogeneous and, therefore, cull it from the image.

Referring again to FIG. 6, at Step 620, segments or other image areas identified to be homogeneous are culled to provide filtered data 460, and at Step 630, the filtered data 460 is passed to the object detector 50. Objects including potential collision threats may be identified by the object detector 50. In circumstances where raw sensor data 430 has been culled by the filter 40, the processing burden on the object detector 50 is reduced. At Step 640, information regarding the detected objects is passed to the output interface 60 and/or the vehicle control system 70.

Figure 9:
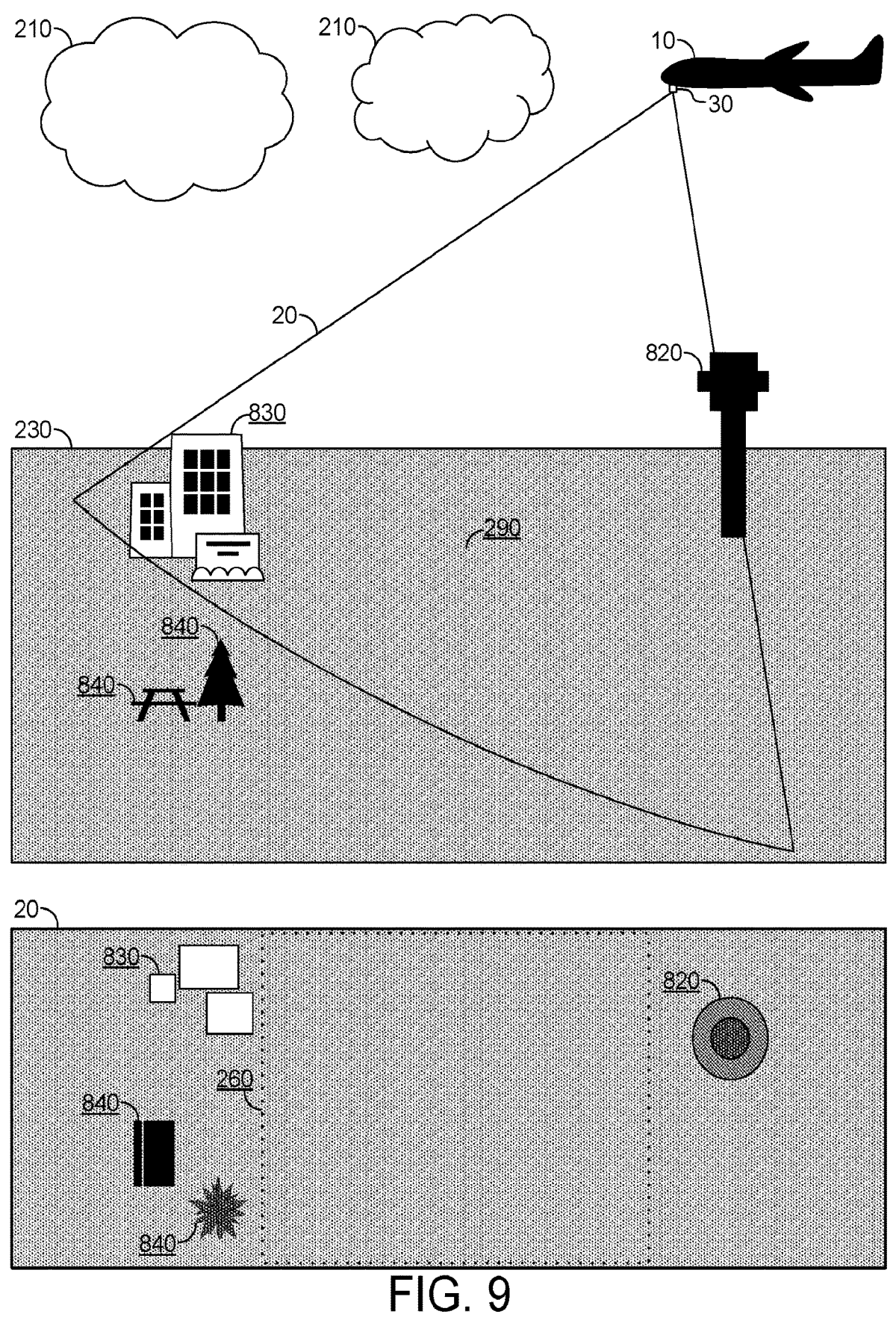

In some embodiments, one or more sensors 30 may face downwards. FIG. 9 depicts a scene 200 external to the vehicle 10 with the sensor 30 directed downward towards the ground 290. Some areas of the scene 200 may include a tower 820, buildings 830, and other obstacles 840. As stated earlier, the views of the ground 290 may include large areas 260 (e.g., grasslands, calm lakes, etc.) that appear homogeneous in the sensor data. As an example, a segment of an image of a large, open grassland may have intensity values that are substantially homogeneous such that the segment can be culled by the filter 40, as described above.

As indicated above, there are various techniques that may be used to determine when a portion of an image is associated with homogeneous sensor values. Indeed, as noted above, this can be achieved by analyzing the image to find an area of the image having homogeneous pixel values. This technique can be used to identify relatively large areas having low entropy indicative of an absence of collision threats, such as a segment of sky or grasslands where pixels have substantially similar intensity values. However, other techniques are possible. For example, in some embodiments, a sensor other than the image sensor 30 that provided the image being processed may be used to identify a portion of the image to be culled.

Figure 10:
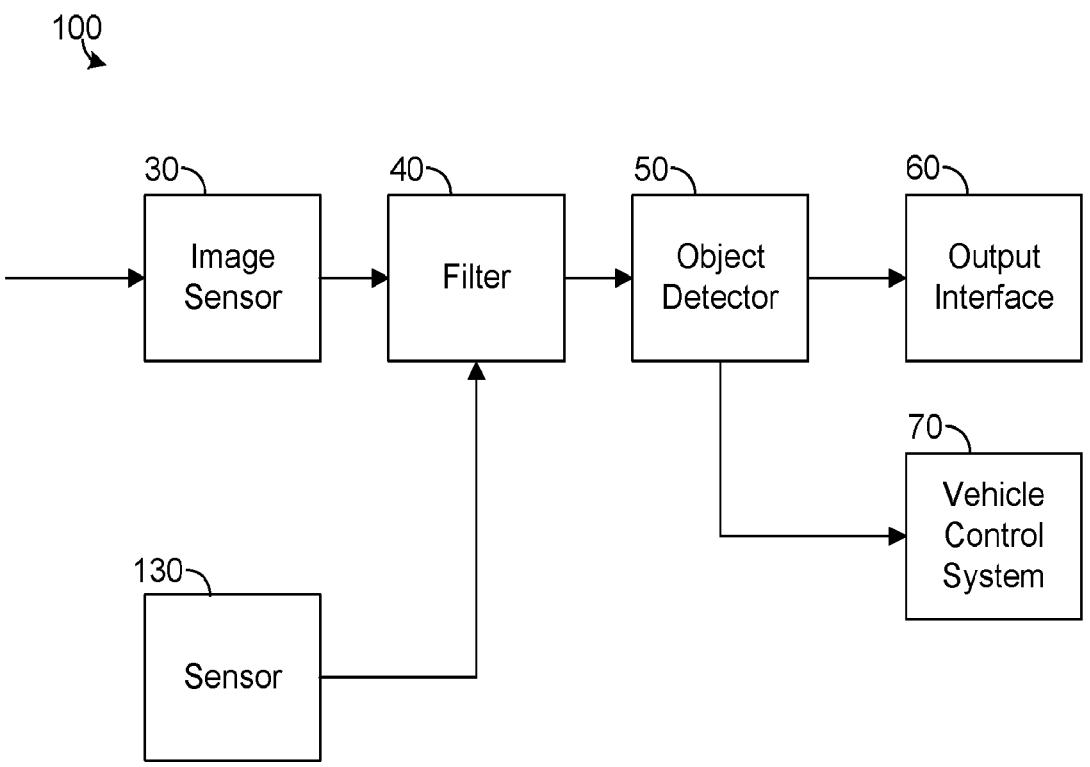
FIG. 10 is a block diagram illustrating an exemplary embodiment of a system for sensing collision threats.

FIG. 10 depicts an exemplary embodiment in which a sensor 130 different than the image sensor 30 providing the image being processed is used to identify an area of the image associated with homogeneous sensor values. The sensor 130 may be another image sensor, such as a camera, or other type of sensor, such as radar or LiDAR. The sensor 130 is configured to provide sensor data for the same geographic region imaged by the image sensor 30. As an example, if the sensor 130 is a camera, the sensor 130 may receive light reflected from the same geographic region imaged by the image sensor 30. That is, the fields of view of the image sensor 30 and the sensor 130 overlap. If the sensor 130 is a radar or LiDAR sensor, then the sensor 130 may be configured to transmit a signal and receive reflections of the signal from same geographic region for which the image sensor 30 receives reflections of light.

The filter 40 is configured to analyze the sensor data from the sensor 130 to identify a homogenous grouping of sensor values, similar to the techniques described above for the image data from the image sensor 30. For example, if the sensor 130 is a radar or LiDAR sensor, it is expected that measurements of the returns from a homogenous area, such as a flat field or the sky in the absence of objects between the vehicle 10 and the homogeneous area, should be substantially similar. Similarly, if the sensor 130 is an image sensor, such as a camera, it is expected that measurements of light from a homogeneous area, such as a field or sky having a substantially uniform color, should be substantially similar. Thus, the sensor data from the sensor 130 can be analyzed to identify a geographic region that is associated with homogeneous sensor values using techniques similar to those described above for identifying an area of image from sensor 30 to be associated with homogeneous pixel values.

After identifying a geographic area associated with homogeneous sensor values based on the sensor 130, the filter 40 may identify the same geographic area in the image received from the image sensor 30. That is, the filter 40 may correlate the geographic region identified from the sensor data provided by the sensor 130 with the same geographic region in the image received from the sensor 30. Thus, the filter 40 identifies the pixels of the image from the sensor 30 that are representative of the same geographic region for which the sensor data from sensor 130 indicated to be homogeneous. The filter 40 may then cull such pixel values from the image, thereby reducing the amount of data that must be processed by the object detector 50 to analyze the image.

Notably, using the sensor data from the sensor 130 to identify a homogeneous area of an image to be culled may enable the filter 40 to cull at least some image data that otherwise might not be identified as homogenous based solely on the image data from sensor 30. As an example, a field may be substantially flat but have drastically varying colors across its surface. Such a field may not appear to have homogeneous pixel values in the image from the sensor 30 but may have homogeneous sensor values in the data from the sensor 130. Similarly, a region of the sky may have differing intensity values due to clouds, pollution, or varying lighting conditions, but such a region may be associated with homogeneous sensor values from the senor 130, such as radar or LiDAR values. In yet other examples, other types of sensors may be used to implement the sensor 130 and provide sensor values that may indicate homogeneous areas that can be culled from the image being processed by the filter 40.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The invention claimed is:

1. A vehicular system for sensing collision threats, comprising:
   a vehicle;
   a first image sensor coupled to the vehicle and configured to capture a first image of a scene external to the vehicle;
   a second sensor coupled to the vehicle and configured to provide sensor values based on reflections from the scene external to the vehicle;
   at least one processor in communication with a non-transitory memory storing instructions, that when executed, cause the processor to:
      identify a homogenous grouping of sensor values from the sensor values provided by the second sensor, wherein the homogenous grouping of sensor values correspond to a first geographic region;
      identify an area of the first image associated with the first geographic region that is correlated to both (i) the homogenous grouping of sensor values provided by the second sensor and (ii) non-homogenous sensor values provided by the first image sensor;
      responsive to identifying the area of the first image associated with both (i) the homogenous grouping of sensor values provided by the second sensor and (ii) the non-homogenous sensor values provided by the first sensor, cull the identified area from the first image thereby providing a filtered image;
      process the filtered image to identify a collision threat within the filtered image; and
      provide information indicative of the detected collision threat.

2. The vehicular system of claim 1, wherein the at least one processor implements a machine learning algorithm for processing the filtered image to identify the collision threat.

3. The vehicular system of claim 1, wherein the homogeneous grouping of sensor values correspond to pixels of the first image.

4. The vehicular system of claim 1, further comprising a second image sensor coupled to the vehicle and configured to capture a second image of the scene, wherein the homogeneous grouping of sensor values correspond to pixels of the second image.

5. The vehicular system of claim 1, wherein the second sensor is a radar sensor.

6. The vehicular system of claim 1, wherein the second sensor is a light detection and ranging (LiDAR) sensor.

7. The vehicular system of claim 1, wherein the at least one processor is configured to determine a value indicative of a homogeneity of the homogeneous grouping of sensor values and compare the value to a threshold.

8. A vehicular system for sensing collision threats, comprising:

a vehicle;

a first image sensor coupled to the vehicle and configured to capture a first image of a scene external to the vehicle;

a second sensor coupled to the vehicle and configured to provide sensor values based on reflections from the scene external to the vehicle;

at least one processor configured to receive the first image, the at least one processor programmed with instructions that, when executed by the at least one processor, cause the at least one processor to:

identify a homogenous grouping of sensor values from the sensor values provided by the second sensor, wherein the homogenous grouping of sensor values correspond to a first geographic region;

determine whether an area of the first image is associated with the first geographic region that is correlated to both (i) the homogenous grouping of sensor values provided by the second sensor and (ii) non-homogenous sensor values provided by the first image sensor;

in response to determining that the area of the first image is associated with both (i) the homogenous grouping of sensor values provided by the second sensor and (ii) the non-homogenous sensor values provided by the first sensor, cull the area from the first image, thereby providing a filtered image;

detect a collision threat for the vehicle based on the filtered image; and provide information indicative of the detected collision threat.

9. The vehicular system of claim 8, wherein the homogeneous sensor values comprise pixels of the first image.

10. The vehicular system of claim 8, further comprising a second image sensor coupled to the vehicle and configured to capture a second image of the scene, wherein the homogeneous grouping of sensor values correspond to pixels of the second image.

11. The vehicular system of claim 8, wherein the second sensor is a radar sensor.

12. The vehicular system of claim 8, wherein the second sensor is a light detection and ranging (LiDAR) sensor.

13. The vehicular system of claim 8, wherein the at least one processor is configured to determine a value indicative of a homogeneity of the homogeneous grouping of sensor values and compare the value to a threshold.

14. A method for sensing collision threats, comprising:

capturing a first image of a scene external to a vehicle with a first image sensor;

receiving a homogenous grouping of sensor values from a second sensor based on reflections from the scene external to the vehicle, wherein the homogenous grouping of sensor values correspond to a first geographic region;

identifying, with at least one processor, an area of the first image associated with the first geographic region that is correlated to both (i) the homogenous grouping of sensor values provided by the second sensor and (ii) non-homogenous sensor values provided by the first image sensor;

responsive to identifying the area of the first image associated with both (i) the homogenous grouping of sensor values provided by the second sensor and (ii) the non-homogenous sensor values provided by the first sensor, culling the area from the first image with the at least one processor;

analyzing the first image subsequent to the culling with the at least one processor;

detecting a collision threat to the vehicle with the at least one processor based on the analyzing; and providing, with the at least one processor, information indicative of the detected collision threat.

15. The method of claim 14, wherein the homogeneous grouping of sensor values correspond to pixels of the first image.

16. The method of claim 14, further comprising capturing a second image of the scene with a second image sensor, wherein the homogeneous grouping of sensor values correspond to pixels of the second image.

17. The method of claim 14, wherein the second sensor is a radar sensor.

18. The method of claim 14, wherein the second sensor is a light detection and ranging (LiDAR) sensor.

19. The method of claim 14, further comprising:

determining a value indicative of a homogeneity of the homogeneous grouping of sensor values; and comparing the value to a threshold.

* * * * *